US008261245B2

(12) United States Patent
Branda et al.

(10) Patent No.: US 8,261,245 B2
(45) Date of Patent: Sep. 4, 2012

(54) METHOD AND SYSTEM FOR ASSOCIATING PROFILER DATA WITH A REFERENCE CLOCK

(75) Inventors: Steven J. Branda, Rochester, MN (US); John J. Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1107 days.

(21) Appl. No.: 12/017,589

(22) Filed: Jan. 22, 2008

(65) Prior Publication Data
US 2009/0187890 A1 Jul. 23, 2009

(51) Int. Cl.
G06F 9/44 (2006.01)

(52) U.S. Cl. ........ 717/131; 717/127; 717/128; 717/130; 717/158

(58) Field of Classification Search .................. None
See application file for complete search history.

(56) References Cited

U.S. PATENT DOCUMENTS

| 5,768,500 | A  | * | 6/1998  | Agrawal et al. ............... 714/47.2 |
|-----------|----|---|---------|----------------------------------------|
| 5,864,682 | A  | * | 1/1999  | Porter et al. .................... 709/247 |
| 6,374,369 | B1 | * | 4/2002  | O'Donnell .................. 714/38.11 |
| 6,467,052 | B1 | * | 10/2002 | Kaler et al. ...................... 714/39 |
| 6,539,339 | B1 | * | 3/2003  | Berry et al. ................... 702/186 |
| 6,598,012 | B1 | * | 7/2003  | Berry et al. ................... 702/187 |
| 6,651,243 | B1 | * | 11/2003 | Berry et al. ................... 717/130 |
| 6,721,941 | B1 | * | 4/2004  | Morshed et al. ............... 717/127 |
| 6,754,612 | B1 | * | 6/2004  | Vanfladern et al. ........... 702/186 |
| 6,904,594 | B1 | * | 6/2005  | Berry et al. ................... 718/100 |
| 6,993,695 | B2 | * | 1/2006  | Rivoir ........................... 714/734 |
| 7,032,214 | B1 | * | 4/2006  | Rodrigues et al. ............ 717/130 |
| 7,035,210 | B2 | * | 4/2006  | Walles .......................... 370/229 |
| 7,331,039 | B1 | * | 2/2008  | Yip et al. ....................... 717/125 |
| 7,392,307 | B2 | * | 6/2008  | Motoyama et al. ........... 709/224 |
| 7,421,681 | B2 | * | 9/2008  | DeWitt et al. ................. 717/128 |
| 7,461,369 | B2 | * | 12/2008 | Zhao et al. .................... 717/131 |
| 7,489,706 | B2 | * | 2/2009  | Hatley et al. ................. 370/469 |
| 7,559,053 | B2 | * | 7/2009  | Krassovsky et al. .......... 717/126 |
| 7,954,094 | B2 | * | 5/2011  | Cascaval et al. .............. 717/145 |
| 8,032,867 | B2 | * | 10/2011 | Bansal .......................... 717/128 |
| 8,032,875 | B2 | * | 10/2011 | Kosche et al. ................ 717/158 |

(Continued)

OTHER PUBLICATIONS

Title: A performance analysis of an optimistic and a basic timestamp-ordering concurrency control algorithms for centralized database systems, author: Orji, C.U et al, source: IEEE, dated:Feb. 1, 1988.*

(Continued)

*Primary Examiner* — Chameli Das
(74) *Attorney, Agent, or Firm* — Toler Law Group (57) ABSTRACT

A computer implemented method, apparatus and program product for analyzing performance data particular to an algorithm using a profiler algorithm, and automatically associates the performance data with a reference clock time. The performance data may be automatically associated with a tag, also associated with the reference clock time. Using the tag, the performance data may be associated with a portion of the algorithm. For instance, the tag may be associated with a corresponding tag associated with the algorithm. User input may be received that designates both the tag and an additional tag associated with the program code. Aspects may identify tags in the performance data that correspond to both the tag and additional tag of program code. The portion of the performance data bounded by the identified tags in the performance data may be retrieved and displayed to a user. In this manner, the performance data may be automatically associated with a portion of algorithm.

17 Claims, 3 Drawing Sheets

U.S. PATENT DOCUMENTS

| | | | |
|---|---|---|---|
| 2005/0039171 A1* | 2/2005 | Avakian et al. | 717/127 |
| 2005/0172306 A1* | 8/2005 | Agarwal et al. | 719/328 |
| 2005/0286564 A1* | 12/2005 | Hatley et al. | 370/503 |
| 2006/0149558 A1* | 7/2006 | Kahn et al. | 704/278 |
| 2006/0230391 A1* | 10/2006 | Alexander et al. | 717/130 |
| 2007/0226698 A1* | 9/2007 | Cascaval et al. | 717/127 |
| 2008/0127149 A1* | 5/2008 | Kosche et al. | 717/158 |
| 2009/0013252 A1* | 1/2009 | DeWitt | 715/716 |
| 2009/0113400 A1* | 4/2009 | Pelleg et al. | 717/130 |
| 2009/0138858 A1* | 5/2009 | Livshits et al. | 717/130 |

OTHER PUBLICATIONS

Title: The perfect and imperfect clocks approach to performance analysis of basic timestamp ordering in distributed databases, author: Bouras, C.J, source: IEEE, dated: May 27, 1993.*

Title: An Approach to Performance Analysis of Timestamp-driven synchronization Mechanism: author: Jefferson et al, source: ACM, dated: Aug. 1984.*

* cited by examiner

METHOD AND SYSTEM FOR ASSOCIATING PROFILER DATA WITH A REFERENCE CLOCK

FIELD OF THE INVENTION

The invention generally relates to computers and computer software. More specifically, the invention relates to computing applications used to analyze system performance.

BACKGROUND OF THE INVENTION

Startup times are an important performance attribute for nearly any computer application. Slow startup times and other performance delays cause irritation and inefficiency. In the case of middleware, the importance of startup time stretches far beyond a matter of perception. Middleware includes software that connects various computer applications across a network in order to exchange data. Disruption attributable to slow startup time in middleware often can lead to lost work, data and man hours.

Middleware is expected to be highly available, i.e., never have downtime or be unavailable. One way to improve an application's high availability rating includes decreasing its recovery time. Thus, decreasing startup time directly improves recovery time.

Delays in startup time is most conveniently identified and analyzed in terms of what defines them—elapsed clock time. As is the case of most applications, a startup log is used to obtain the best record of that which contributes to total wall clock startup time. However, these logs are limited in that they fail to identify startup specifics, making it difficult to isolate what needs to be changed to improve startup time. That is, system logs contain relatively high-levels of information and do not include the granularity needed by a programmer to effectively locate problems.

The granularity typically required by a programmer can sometimes be obtained using a profiler. A profiler comprises an algorithm that may be used to capture events and other statistical information about an executing program. The usual goal of profiling is to determine which parts of a program to optimize for speed or memory usage. The output of the profiler typically comprises a statistical summary of the events observed. Typical output, for instance, may relate to the frequency and duration of function calls. Profilers use a wide variety of techniques to collect data, including hardware interrupts, code instrumentation, operating system hooks, and performance counters.

Limitations of current profiling solutions, however, complicate efforts to optimize startup times and other performance attributes. While profilers can be indispensable in optimizing certain types of applications, profiles cannot easily be analyzed in terms of wall clock time. Conventional profilers basically report only the central processing unit (CPU) time, or cycles, required to execute a given piece of code. Profilers are incapable of expressing events in terms of a clock time. Unfortunately, applications such as startup time are measured in terms of wall clock time, which includes any program delay that may have occurred. This conventional limitation makes it hard to pinpoint in terms of wall clock time exactly how to decrease startup time. Programmers are consequently relegated to tedious and uncertain analysis that includes trying to manually locate and address problems based on clues in the log files. Finding the correlation by hand is often impractical because the exchange between the startup log time and the profile time is inexact.

The limitations of conventional profilers can be exacerbated in multithreaded environments. Such environments permit computer programs to concurrently execute in multiple threads so that multiple tasks can essentially be performed at the same time. Threads generally represent independent paths of execution for a program. In an e-commerce computer application, for example, different threads might be assigned to different customers so that each customer's specific e-commerce transaction is handled in a separate thread. The multithreaded nature of such applications compound the lack of correspondence between the profile data and output files. Processors switch back and forth between threads over a given period with such frequency as to further attenuate any link between CPU cycles and actual wall clock time.

Therefore, what is needed is an improved manner of analyzing startup time and other aspects of computer performance.

SUMMARY OF THE INVENTION

The present invention provides an improved computer implemented method, apparatus and program product for analyzing performance data by generating performance data particular to the program code using a profiler algorithm, and automatically associating the performance data with a reference clock time. Where desired, the performance data may be analyzed. To this end, aspects of the invention may automatically associate the performance data with a tag, also associated with the reference clock time. Embodiments of the invention may associate the performance data with a portion of the program code using the tag, which may also be associated with the program code.

In one embodiment, the tag may be associated with a corresponding tag associated with the program code. User input may be received that designates both the tag and an additional tag associated with the program code. Aspects may identify tags in the performance data that correspond to both the tag and additional tag of program code. The portion of the performance data bounded by the identified tags in the performance data may be retrieved and displayed to a user. In this manner, embodiments may automatically associate the performance data with a portion of program code.

Where desired, the program code may be modified based on the analysis of the program code. Performance data may be generated according to an event-based scheme configured to populate the performance data. Performance data may alternatively be generated according to frequency-based scheme configured to populate the performance data. The frequency may be varied to achieve a desired level of granularity.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Embodiments consistent with the principles of the present invention may include associating data generated by a profiler with an output file of the application based on a reference, or wall clock time. As such, the profile data may be associated with the wall clock time. For instance, a tag, or link, may be created between the tracked output files and the point in the profile data also associated with the wall clock time. In this manner, the output files and profile data may be synchronized according to the reference clock. In one embodiment, the tags may be inserted into or be otherwise associated with the output file of an application of interest. In this manner, embodiments consistent with the invention may provide a tighter coupling of the profiling and startup log process. In so doing, embodiments may provide a much more accurate representation of server startup time towards enabling programmers to make better optimizations.

For purposes of this specification, wall clock time may include any time-based reference, or counter, to include a system hardware/CPU clock. A tag may include a marker associated with a reference clock time. As such, a tag of one embodiment may comprise a timestamp, while a tag of another may be used to designate or mark data in manner reflective of the reference clock time.

When a user notices in a log file a large startup time during analysis, he or she may select inserted tags in the log file, and in so doing, link to a corresponding portion of the profile data bounded by corresponding tags. As such, the portion of the profile data may correspond to profile data collected during the period of time bounded by the tags in the log file. While this portion of profile data may be relatively insignificant in terms of CPU time, embodiments nonetheless may enable a user to focus in on the relevant portion of the profile data. For example, the user may be linked in such a manner as to be focused on the portion of the profile data corresponding to startup. By initially including wall clock time in the analysis, the user may be made aware that the portion of profile data is significant. The user may then make any necessary improvements.

Embodiments provide a mechanism inside a profiler that provides improved correlation between the application logs and profile. Embodiments may operate by allowing a user to configure a profile by selecting an application that they want to profile and the file where the application's startup log may be generated. If the language environment allows it, the profiler may also scan the application for output files and directly interact with those via a profiling interface, instead of using operating system level file access.

When the application is launched, the profiler may begin to profile the code normally. As the profiler collects the performance information for the application, it may put special entries, or tags, in the selected log files. These tags may comprise time-based information that the profiler may use to associate the specific point in the log with a specific part of the profile.

Once an application is started, and the profile has been collected and saved, the user may instruct the profiling user interface to correlate the CPU profile to the startup log. The profiling user interface may process the tags and the startup log and display a view of the startup log to the user where the tags have been replaced with dynamic links to the CPU profile. This feature may allow the user to do things like select two tags, and as a result, see only the selection of the profile that was collected between those two tags. The feature may allow the user to select a time stamp and see the method call stack that was being executed when the tag was generated. In the case where an application is writing to the startup log via the profiling interface instead of through the operating system file level access, it is possible to improve the mapping between the startup log and the profile. With the profiling interface, it is possible to intercept every single write to that file. As such, embodiments may tag every single entry in the startup log and directly link it to a piece of the CPU profile. This may provide the best possible granularity for correlating CPU time and wall clock time.

Figure 1:
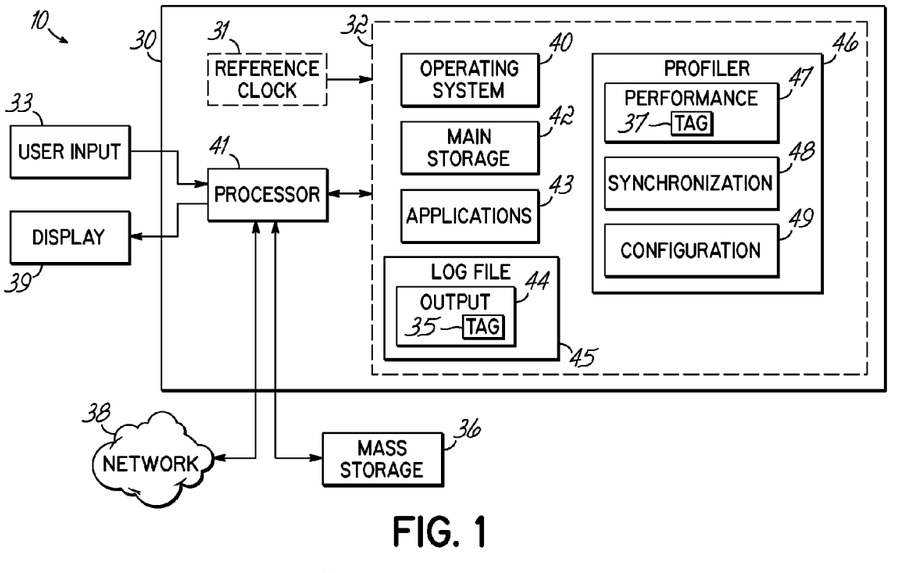
FIG. 1 shows a block diagram of a computer system configured to associate profile data with a reference clock measurement in accordance with the principles of the present invention.

While the principles of this invention do not limit its forum or application, one profile and application output file synchronization embodiment capitalizes on the structure available through the system exemplified in FIG. 1. FIG. 1 generally shows a block diagram of a networked computer device, or system 10, configured to associate performance data 47 generated by a profiler 46 with a reference clock time 31. The system 10 more particularly comprises one or more client computer(s) 30 coupled to a network 38. Network 38 represents a networked interconnection, including, but not limited to, local area, wide area, wireless, and public networks (e.g., the Internet). Moreover, any number of computers and other devices may be networked through network 38, e.g., multiple servers.

Computer system 10 will hereinafter also be referred to as an "apparatus," "computer," "tool," "device," or "system," although it should be appreciated that the terms may respectively include many other controller configurations. Moreover, while only one network interface device is shown in FIG. 1, any number of computers and other devices may be networked through network 38. In still another embodiment, the system 10 may be implemented in a standalone configuration, i.e., disconnected from another computer or computer network.

Computer device 30 typically includes at least one processor 41 coupled to a memory 32. Processor 41 may represent one or more processors (e.g., central processing units, microprocessors). Memory 32 may represent the SRAM devices comprising the main storage 42 of computer device 30, as well as any supplemental levels of memory, e.g., cache memories, non-volatile or backup memories (e.g., programmable or flash memories), read-only memories, etc. In addition, memory 32 may be considered to include memory storage physically located elsewhere in computer device 30, e.g., any cache memory present in processor 41, as well as any storage capacity used as a virtual memory, e.g., as stored within a database, or on another computer coupled to computer device 30 via network 38.

Computer device 30 also may receive a number of inputs and outputs for communicating information externally. For interface with a user, computer device 30 typically includes one or more input devices 33 (e.g., a keyboard, a mouse, a trackball, a joystick, a touch pad, iris/fingerprint scanner, and/or a microphone, among others). The computer device 30 additionally includes a display 39 (e.g., a CRT monitor, an LCD display panel, and/or a speaker, among others). It should be appreciated, however, that with some implementations of the computer device 30, direct user input and output may be unsupported by the computer, and interface with the server computer device 30 may be implemented through a computer or workstation networked with the computer device 30.

For additional storage, computer device 30 may also include one or more mass storage devices 36 configured to store, for instance, the database. Exemplary devices 36 can include: a floppy or other removable disk drive, a flash drive, a hard disk drive, a direct access storage device (DASD), an optical drive (e.g., a CD drive, a DVD drive, etc.), and/or a tape drive, among others. Furthermore, computer device 30 may include an interface with one or more networks (e.g., a LAN, a WAN, a wireless network, and/or the Internet, among others) to permit the communication of information with other computers coupled to the network 38. It should be appreciated that computer device 30 typically includes suitable analog and/or digital interfaces between processor 41 and each of components 32, 33, 36, 38 and 39.

Computer device 30 may operate under the control of an operating system 40, and executes various computer software and hardware applications, components, programs, modules, e.g., a main memory storage 42 and runtime applications 43, among others. Output files 44, or streams, generated using the applications 43 may be stored in a log file 45. As discussed herein, the output file(s) 44 may include one or more tags 35. As discussed herein, a tag 35 may include a marker associated with an output from a reference clock 31. As shown in FIG. 1, the profiler 46, or profiler algorithm, includes access to performance data 47, or profile data. The performance data 47 may include one or more tags 37 that link or otherwise correspond to tags 35 in the output file(s) 44. The profiler 46 may additionally include a synchronization program 48 and a profiler configuration 49.

The profiler 46 may be used to capture events and other statistical information about executing program code. For example, the profiler 46 may include an API used to capture information regarding memory and other resource usage for the purpose of identifying potential memory leaks, garbage collection problems, or other circumstances that may lead to excessive consumption of system resources. As another example, the profiler 46 may be used to capture information such as the time spent in various routines, the number of instances created for certain object classes, and the state of a call stack for the purpose of identifying particular sections of program code that perform sub-optimally. Profiling may be performed by instrumenting program code prior to compilation, or alternatively, a runtime environment may support data collection capabilities to capture relevant profiling information for uninstrumented program code. Profiling may be utilized in a number of computer environments. As shown in FIG. 1, profiling may be utilized for profiling program code executing within the memory 32, which may include a Java virtual environment.

Various applications, components, programs, markers, modules, etc. may also execute and/or be stored on one or more processors and/or memory/caches of another computer coupled to computer device 30 via a network 38, e.g., in a distributed or client-server computing environment, whereby the processing required to implement the functions of a computer program may be allocated to multiple computers over a network.

Some embodiments consistent with the invention include microprocessors to execute multiple threads in parallel, effectively providing many of the same performance gains attainable through the use of multiple microprocessors. Embodiments may further include a number of computer software and hardware technologies to facilitate additional parallel processing. From a software standpoint, multithreaded operating systems and kernels have been developed, which permit computer programs to concurrently execute in multiple threads so that multiple tasks can essentially be performed concurrently. Threads generally represent independent paths of execution for a program.

One logical extension of parallel processing is the concept of logical partitioning, where a single physical computer is permitted to operate essentially like multiple and independent virtual computers (referred to as logical partitions), with the various resources in the physical computer (e.g., processors, memory, input/output devices) allocated among the various logical partitions. Where so configured, each logical partition of an embodiment executes a separate operating system, and from the perspective of users and of the software applications executing on the logical partition, operates as a fully independent computer.

Moreover, while computer device 30 may include a logically partitioned and networked computer device, other embodiments of the device 30 may include relatively smaller and more focused computing applications or components, such as a cellular phone, a PDA, or a microchip.

In general, the routines executed to implement the embodiments of the invention, whether implemented in hardware, as part of an operating system, or as a specific application, component, program, engine, process, programmatic tool, object, module, or sequence of instructions, or even a subset thereof, may be referred to herein as an "algorithm," "function," "program code," or simply "program." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. One of skill in the art should appreciate that embodiments consistent with the principles of the present invention may nonetheless use program code resident at only one, or any number of locations.

Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of computer readable, signal bearing media used to actually carry out the distribution. Examples of signal bearing, computer readable media include, but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or engine within which it is implemented in a specific embodiment of the invention. However, it should be appreciated that any particular program nomenclature that follows is used merely for convenience, and thus the invention should not be limited to use solely in any specific application or engine identified and/or implied by such nomenclature.

Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

The various software components and resources illustrated in FIG. 1 may be implemented in a number of manners, including using various computer software applications, routines, components, programs, objects, modules, data structures and programs. Those skilled in the art will further recognize that the exemplary environments illustrated in FIG. 1 are not intended to limit the present invention. Indeed, those skilled in the art will recognize that other alternative hardware and/or software environments may be used without departing from the scope of the invention.

Figure 2:
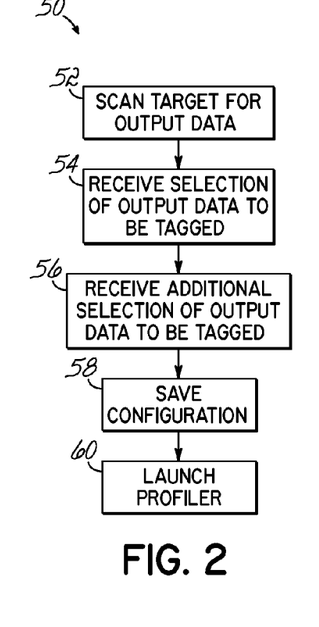
FIG. 2 shows a flowchart having steps executable by the system of FIG. 1 for configuring a profiling process that correlates CPU time profiles and wall clock measurements.

The flowchart 50 shown in FIG. 2 shows processes executable by the system 10 of FIG. 1 for configuring a profiling process that correlates CPU time profiles and wall clock measurements. More particularly, the steps of the flowchart 50 show processes that may be executed by an interface of the profiler for configuring the correlation, or association operation. For example, the flowchart 50 may include processes initiated using a graphical user interface to configure the synchronization operation before profile data is actually collected. As such, the steps of FIG. 2 may presume that a user has selected a synchronization feature of the profiler.

Turning more particularly to the steps of the flowchart 50, the profiler at block 52 of FIG. 2 may scan a target runtime for output files 44, or streams. An output file 44 may comprise data generated or otherwise output by an application 43 that may be profiled. For example, in a JAVA environment, the output file 44 may include a programmatic construct, such as an object reference to which bytes may be written and which may be put out to a file or a socket. In one embodiment, the profiler 46 at block 52 may use heuristics to scan program code/targeted runtimes for the output files 44. For instance, the profiler 46 may recognize an intended output location and intercept the output file. When the performance data 47 comprising the profile is being collected, the profiler 46 may connect to a runtime application 43 and register to receive certain events. For instance, the profiler 46 may as the application 43 is executed, the profiler 46 may be notified of method entry, exit and other events that are included in the performance data 47. Alternatively and/or additionally, the profiler 46 may collect performance data 47 according to a frequency based embodiment discussed in more detail in the text described in FIG. 3.

At block 54 of FIG. 2, the profiler 46 may receive a selection from a user. The selection may indicate which located output files 44 are desired to be tagged while the profile/performance data 47 is being collected. Put another way, the user may select at block 54 an output file 44 that is desirable to be linked temporally to the performance data 47 generated by the profiler 46.

The profiler 46 at block 56 of FIG. 2 may receive user input specifying any additional local files that are desirable to tag as the profile is gathered. This may be the case where the profiler 46 is unaware of a program of specific interest to the user. The user may designate at block 56 that program/output file for synchronization.

The profiler 46 may save the profiler configuration 49 at block 58, and the profiling operation may be launched at block 60.

Figure 3:
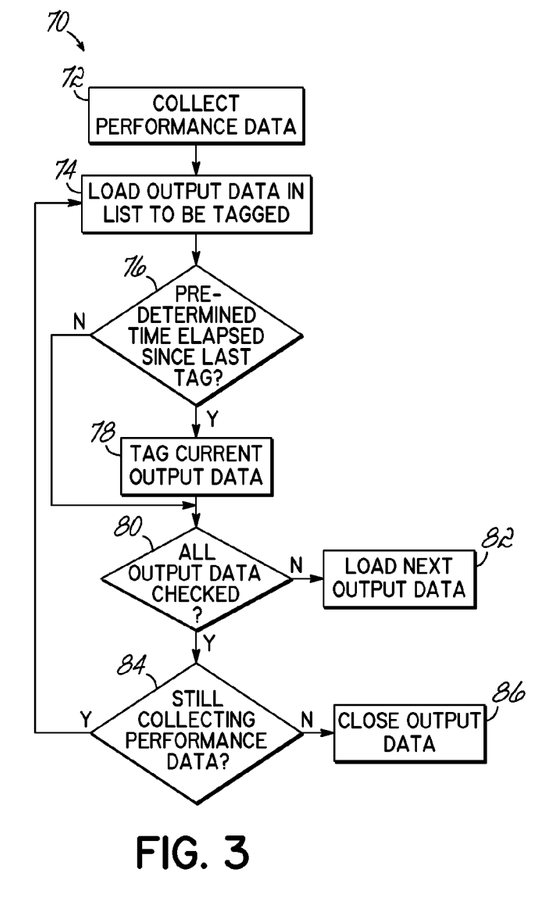
FIG. 3 shows a flowchart having steps executable by the system of FIG. 1 for conducting a frequency based operation for linking performance data generated by a profiler with the wall clock measurements.

The flowchart 70 of FIG. 3 shows steps executable by the system 10 of FIG. 1 for conducting a frequency based operation for linking performance data generated by the profiler with the reference clock time in a manner that is consistent with embodiments of the present invention. Turning more particularly to the flowchart 70, the profiler 46 may begin at block 72 collecting the performance data 47.

At block 74 of FIG. 3, the profiler 46 may load a first output file 44/stream into the list within the profiler 46 of files 44 to tag at a specified frequency. The list of files 44 to be profiled may have been designated using the processes described in FIG. 2.

The profiler 46 at block 76 may determine if a certain number of milliseconds or other time increment has elapsed since a last tag for the current output file 44. For example, the profiler 46 may make sure that n milliseconds have elapsed since a last tag 35 was assigned in the current output file 44. The processes of block 76 thus allow a user to adjust the granularity of the frequency of the operation.

If desired time has elapsed at block 76, then the profiler 46 at block 78 may tag the current output file 44 for later association with at least one of the wall clock 31 and the profile performance data 47.

At block 80 of FIG. 3, the profiler 46 may determine if the entire list of output files 44 has been checked. If not, then the profiler 46 may load at block 82 the next file 44 into the list. Alternatively, at block 84 of FIG. 3, the profiler 46 may determine if it is still collecting the profile performance data 47. If so, then the profiler 46 may continue to load at block 74 the output files 44 at the specified frequency.

Where the profiler 46 is alternatively still collecting at block 84, the profiler 46 may properly close out the output files 44 at block 86 to preserve changes. While not explicitly shown in the flowchart 70, one skilled in the art will recognize that yield or sleep functions may be included within profiling processes consistent with embodiments of the invention to preserve CPU cycles, as needed.

Figure 4:
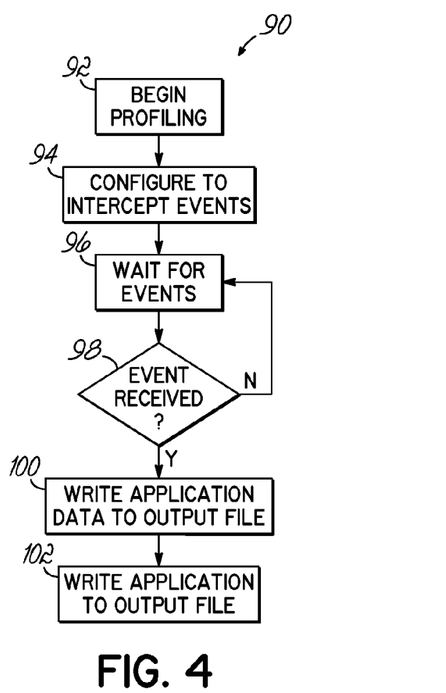
FIG. 4 shows a flowchart having steps executable by the system of FIG. 1 for associating time clock and performance data using an event based operating process.

FIG. 4 shows a flowchart 90 having steps executable by the system 10 of FIG. 1 for associating time clock and performance data 47, e.g., CPU information, using an event based operating process. As such, the flowchart 90 shows steps executed by the profiler to tag output files 44 for later association with at least one of the performance data 47 and the clock time 31.

Turning more particularly to the steps of the flowchart 90 of FIG. 4, the profiler 46 may begin at block 92 collecting profile information comprising the performance data 47. As discussed herein, profile information may comprise performance data 47 collected by the profiler 46.

To this end, the profiler 46 may configure at block 94 runtime operations to collect event information. For example, the profiler 46 may be configured to intercept write events to selected output files 44. As the application 43 is executed, the profiler 46 may be notified of method entry, exit and other events that are included in the performance data 47.

The profiler 46 may wait at block 96 for events to occur. Trigger technologies known by those of skill in the art may be used to facilitate event detection.

At block 98 of FIG. 4 the profiler 46 may become aware or otherwise determine that an event has been received. If so, the profiler at block 100 may write a tag, or time marker/indicator, to the output file 44. The profiler may write at block 102 the data that the application 43 was originally going to write to the output file 44.

Figure 5:
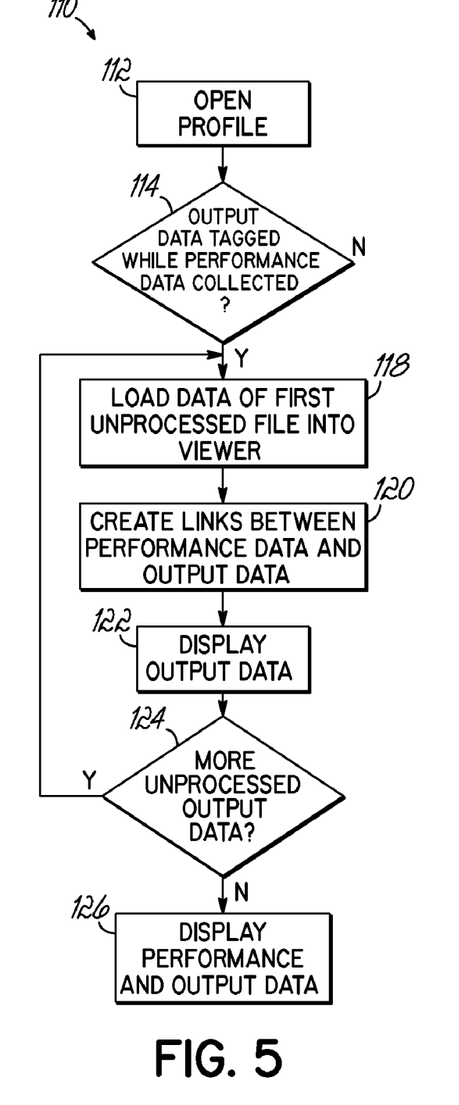
FIG. 5 shows a flowchart having steps executable by the system of FIG. 1 for linking tags between the performance data and output files.

The flowchart 110 of FIG. 5 shows processes executable by the system 10 of FIG. 1 for processing profile data, including performance data 47. More particularly, the steps of the flowchart 110 link tags between the performance data 47 and output files 44. Turning more specifically to the steps of the flowchart 110 of FIG. 5, the profile and associated performance data 47 may be opened at block 112.

The system 10 may determine at block if output files 44 were being tagged while the profile was being collected. For instance, the profiler 46 may determine if the tags are present from header data or metadata. If not, performance data 47 may be displayed at 116 according to normal profile operations.

Alternatively at block 118 of FIG. 5, the profiler 46 may load the output files 44 that were being tagged. More particularly, the profiler 46 may load at block 118 the data of the first unprocessed file into the viewer.

The profiler may create links at block 120 between the tags 35, 37 in the output file 44 and the performance data 47. In one embodiment, the profiler 46 may read a first tag 35 in the output file 44, and then locate a corresponding tag 37 in the performance data 47. Since the profiler 46 is aware of the point in the process when the tag 35 in the output data was made, the profiler 46 may mark the tags 37 in the performance data 47 during post processing. Alternatively, the profiler 46 may concurrently enter tags 37 in the performance data as tags 35 are entered in the output files 44. In any case, the profiler 46 may create a link between the corresponding tags 35, 37. In one embodiment, the link functions in an analogous manner to a hyperlink in a web browser.

The profiler may display in the viewer of the profiler 46 at block 122 of FIG. 5 the resultant file having the linked tags 35, 37. Where desired, a user may manually modify links.

The profiler at block 124 may determine if there are more unprocessed output files 44. If so, the profiler may load the data of the next unprocessed file 44 into the viewer back at block 118.

Where there are no more unprocessed files, the profile data, including the tagged performance data 47, may be displayed along with the output files to the user at block 126.

While the embodiment of FIG. 5 cycles through all the unprocessed files, one skilled in the art will recognize that a more selective approach to addressing unprocessed files may be used. Additionally, processing may occur in real time, as opposed to as a post-processing step.

Figure 6:
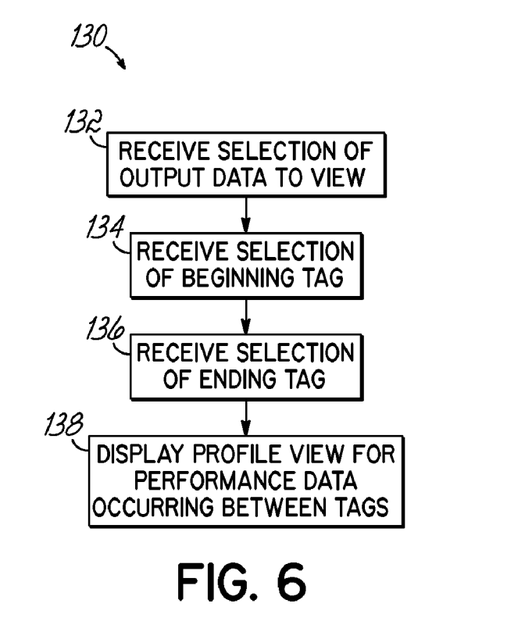
FIG. 6 shows a flowchart having steps executable by the system of FIG. 1 for selectively displaying performance data in association with the wall clock measurements.

The flowchart 130 of FIG. 6 shows the steps executable by the system 10 of FIG. 1 for selectively displaying performance data 47 in association with wall clock time in accordance with the principles of the underlying invention. More particularly, the flowchart 130 shows steps executed by the profiler to display a profile view for events occurring between selected tags.

Turning more particularly to the steps of the flowchart 130, the profiler 46 may receive at block 132 of FIG. 6 a selection from a user indicating an output file 44 that is desired to be viewed. The output file 44 may include tags 35 corresponding to both the reference clock 31 and corresponding tags 37 of the performance data.

The profiler at block 134 may prompt and receive user input selecting a beginning tag 35. At block 136 of FIG. 6, the profiler 46 may prompt and receive user input selecting an ending tag 35.

The profiler 46 may then retrieve and display at block 138 performance data 47 showing the events that occurred between the tags 37 corresponding to the two selected time stamps. In this manner, the user may be presented with only the performance data 47 of interest, based on the clock time. This feature may significantly aid program developers by helping them focus on relevant code, in addition to removing from consideration large portions of code that are not relevant to the particular profiling operation.

While the present invention has been illustrated by a description of various embodiments and while these embodiments have been described in considerable detail, it is not the intention of the Applicants to restrict, or, in any way limit the scope of the appended claims to such detail. The invention is not limited to interactions with a Java object oriented computing environment. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. A computer implemented method of analyzing program code, the method comprising:
generating performance data particular to the program code using a profiler;
automatically associating a portion of output data produced by the profiler with a reference clock time by inserting a first timestamp representing the reference clock time in the output data;
automatically associating a portion of the performance data with the reference clock time by inserting a second timestamp representing the reference clock time in the performance data;
automatically associating a second portion of the output data with a second reference clock time by inserting a third timestamp representing the second reference clock time in the output data; and
displaying the output data.

2. The method of claim 1, further comprising inserting a first hyperlink in the output data linking the first timestamp to the second timestamp, and inserting a second hyperlink in the performance data linking the second timestamp to the first timestamp.

3. The method of claim 1, further comprising:
receiving user input selecting the first timestamp; and
identifying the portion of the performance data based on a match between the first timestamp and the second timestamp.

4. The method of claim 3, further comprising displaying the identified portion of the performance data.

5. The method of claim 1, wherein generating the performance data particular to the program code using the profiler further comprises generating the performance data according to at least one of an event-based scheme and a frequency-based scheme configured to populate the performance data.

6. The method of claim 1, wherein generating the performance data particular to the program code using the profiler further comprises generating the performance data according to a frequency-based scheme configured to populate the performance data based on a user selectable frequency.

7. An apparatus, comprising:
a memory storing an application and a profiler;
a reference clock configured to generate a clock time;
program code resident in the memory; and
a processor in communication with the memory and the reference clock, the processor configured to:
execute the program code to generate performance data particular to the application using the profiler;
automatically associate a portion of output data produced by the profiler with the reference clock time by inserting a first timestamp representing the reference clock time in the output data;
automatically associate a portion of the performance data with the reference clock time by inserting a second timestamp representing the reference clock time in the performance data; and automatically associate a second portion of the output data with a second reference clock time by inserting a third timestamp representing the second reference clock time in the output data.

8. The apparatus of claim 7, wherein the processor is multithreaded.

9. The apparatus of claim 7, wherein the processor is configured to execute the program code to insert a first hyperlink in the output data linking the first timestamp to the second timestamp, and insert a second hyperlink in the performance data linking the second timestamp to the first timestamp.

10. The apparatus of claim 7, wherein the processor is configured to execute the program code to:

receive user input selecting the first timestamp; and identify the portion of the performance data based on a match between the first timestamp and the second timestamp.

11. The apparatus of claim 10, wherein the processor is configured to execute the program code to display the identified portion of the performance data.

12. The apparatus of claim 7, wherein the processor is configured to execute the program code to generate the performance data particular to the application using the profiler by generating the performance data according to at least one of an event-based scheme and a frequency-based scheme configured to populate the performance data.

13. The apparatus of claim 7, wherein the processor is configured to execute the program code to generate the performance data particular to the application using the profiler by generating the performance data according to a frequency-based scheme configured to populate the performance data based on a user selectable frequency.

14. A program product, comprising:

program code configured to:

generate performance data particular to an application using a profiler;

automatically associate a portion of output data produced by the profiler with a reference clock time by inserting a first timestamp representing the reference clock time in the output data;

automatically associate a portion of the performance data with the reference clock time by inserting a second timestamp representing the reference clock time in the performance data;

automatically associate a second portion of the output data with a second reference clock time by inserting a third timestamp representing the second reference clock time in the output data;

display the output data;

receive user input selecting the first timestamp;

identify the portion of the performance data based on a match between the first timestamp and the second timestamp; and display the identified portion of the performance data; and a non-transitory computer readable storage medium storing the program code.

15. The program product of claim 14, wherein the program code is configured to insert a first hyperlink in the output data linking the first timestamp to the second timestamp, and insert a second hyperlink in the performance data linking the second timestamp to the first timestamp.

16. The program product of claim 14, wherein the program code is configured to generate the performance data particular to the application using the profiler by generating the performance data according to at least one of an event-based scheme and a frequency-based scheme configured to populate the performance data.

17. The program product of claim 14, wherein the program code is configured to generate the performance data particular to the application using the profiler by generating the performance data according to a frequency-based scheme configured to populate the performance data based on a user selectable frequency.

* * * * *